Figure 1:
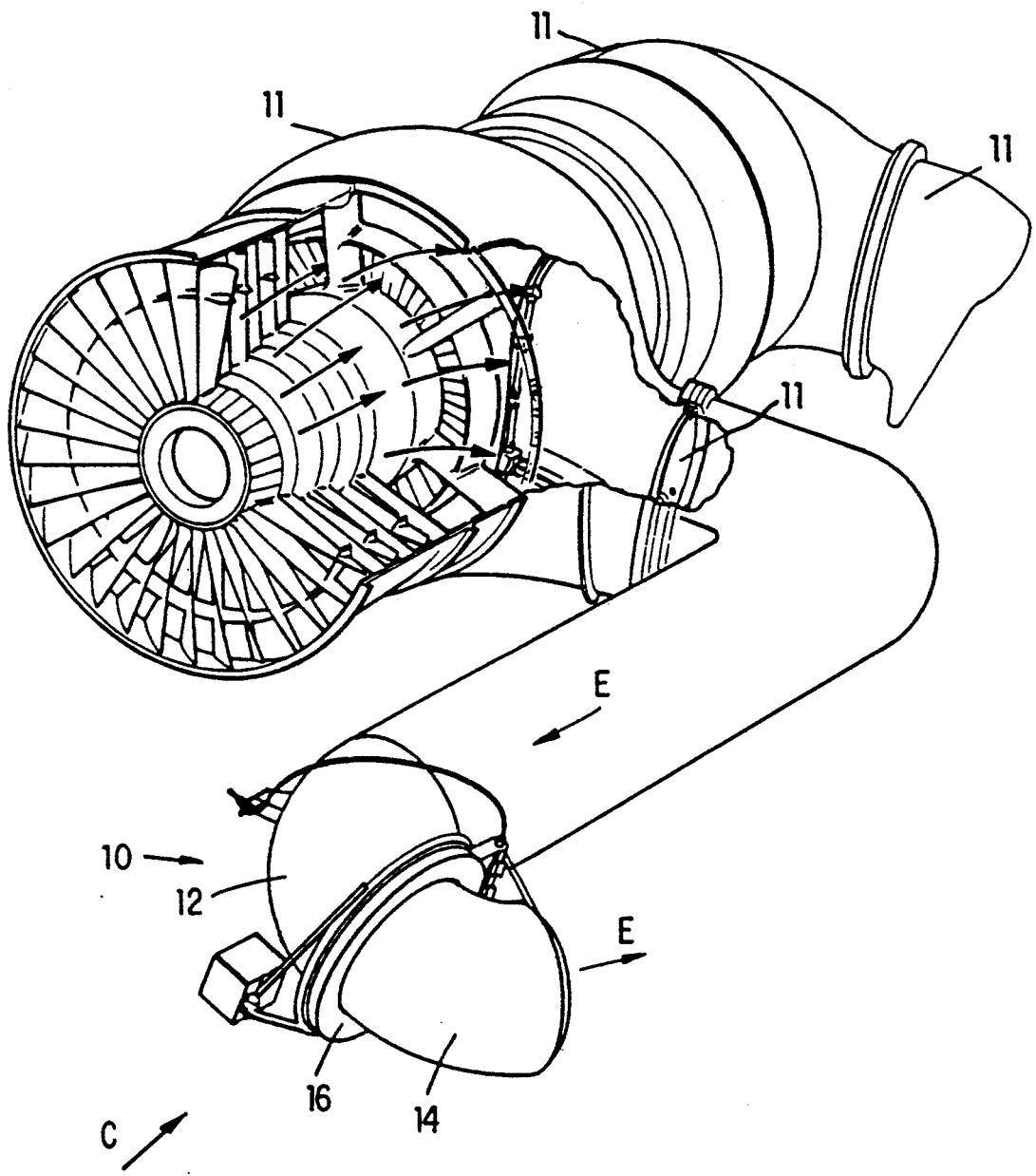

United States Patent [19]

Pesyna et al.

[11] Patent Number: 5,323,606
[45] Date of Patent: Jun. 28, 1994

[54] STOWABLE NOZZLE

[75] Inventors: Kenneth M. Pesyna, Acworth, Ga.; William J. Lewis, Bristol, Great Britain

[73] Assignees: Rolls-Royce plc, London, England; Rolls-Royce Incorporated, Reston, Va.

[21] Appl. No.: 21,107

[22] Filed: Feb. 23, 1993

[51] Int. Cl.$^5$ ............................................. F02C 3/00
[52] U.S. Cl. ....................................... 60/232; 60/271
[58] Field of Search .................. 60/226.1, 228, 232, 60/262, 263, 271; 239/265.19, 265.25, 265.33, 265.35; 244/12.4, 12.5, 23 D

[56] References Cited

U.S. PATENT DOCUMENTS

| | | |
|---|---|---|
| 3,164,337 | 1/1965 | Hooper ........................... 239/365.35 |
| 3,400,540 | 9/1968 | Cresswell et al. .............. 239/265.35 |
| 3,835,643 | 9/1974 | De Garcia, Jr. et al. ..... 239/265.33 |
| 4,679,732 | 7/1987 | Woodward ............................ 60/232 |
| 4,713,935 | 12/1987 | Szuminski et al. ..................... 60/229 |
| 4,840,329 | 6/1989 | Szuminski et al. ..................... 60/229 |

FOREIGN PATENT DOCUMENTS

| | | |
|---|---|---|
| 1236945 | 3/1967 | Fed. Rep. of Germany ......................... 239/265.35 |
| 1288921 | 2/1969 | Fed. Rep. of Germany ..... 244/12.5 |
| 1018581 | 1/1966 | United Kingdom . |
| 1435567 | 5/1976 | United Kingdom . |
| 2241021 | 8/1991 | United Kingdom ........... 239/265.35 |
| 2247048 | 2/1992 | United Kingdom . |
| 2254299 | 10/1992 | United Kingdom ............... 244/12.4 |

Primary Examiner—Richard A. Bertsch
Assistant Examiner—Timothy S. Thorpe
Attorney, Agent, or Firm—Oliff & Berridge

[57] ABSTRACT

A vectorable nozzle for directing the thrust produced by a gas turbine engine includes a duct, at least one toroidal nozzle segment, and a carrier ring for mounting the nozzle segment to the duct. The nozzle segment is hinged to the outer circumferential surface of the carrier ring about its toroidal axis. The carrier ring is rotatably mounted to the external surface of the duct at the downstream end thereof by means of a roller element bearing. The arrangement is such that the nozzle segment is moveable between a stowed location within the airframe space envelope and a deployed location. Once deployed the carrier ring is able to rotate the nozzle segment relative to the duct in order to vector the thrust produced by the engine.

13 Claims, 6 Drawing Sheets

STOWABLE NOZZLE

This invention relates to a stowable nozzle for a gas turbine engine. In particular, the invention concerns a stowable nozzle for a vertical take-off and landing (VTOL) aircraft utilising vectoring nozzles to direct engine thrust.

In known VTOL aircraft types vectorable nozzles are often mounted on axes orthogonal to the main aircraft and engine axis. This practice provides for improved aircraft stability during vertical and transitional flight manoeuvres. The resultant side mounted vectorable nozzles, however, tend to increase the aircraft cross section and hence cause additional drag to be imparted on the aircraft during normal forward flight manoeuvres. This is of particular concern in the case of high speed VTOL aircraft applications. It is therefore desirable to provide rectractable vectorable nozzles for VTOL aircraft applications, which can be selectively deployed for use during vertical and transitional flight and stowed within the airframe envelope during periods of non use; i.e. during forward flight manoeuvres when it is more desirable to utilise a conventional coaxial nozzle for directing engine thrust rearwards.

A known stowable vectorable nozzle comprises a plurality of telescopic deflector segments. The segments are mounted on a common axis and rotate between stowed and deployed positions. Unfortunately nozzles of this type are only capable of thrust vectoring if located ventrally within the airframe.

The present invention has for an objective to provide a stowable vectorable nozzle capable of vectoring thrust between vertical and forward directions without the need for ventral location within the airframe.

According to the invention there is provided a vectorable nozzle for a gas turbine engine comprising, a supply duct, at least one nozzle segment moveable between a stowed location and a deployed location, which, in use, cooperates with the duct to define a fluid flow passage, a carrier ring for mounting the nozzle segment relative to the duct, the nozzle segment being mounted for rotation relative to the carrier about a first axis for nozzle deployment, and the carrier being mounted for rotation relative to the duct about a second axis for nozzle vectoring, a first actuator means for rotating the nozzle segment about the first axis, and a second actuator means for rotating the carrier about the second axis.

Figure 2:
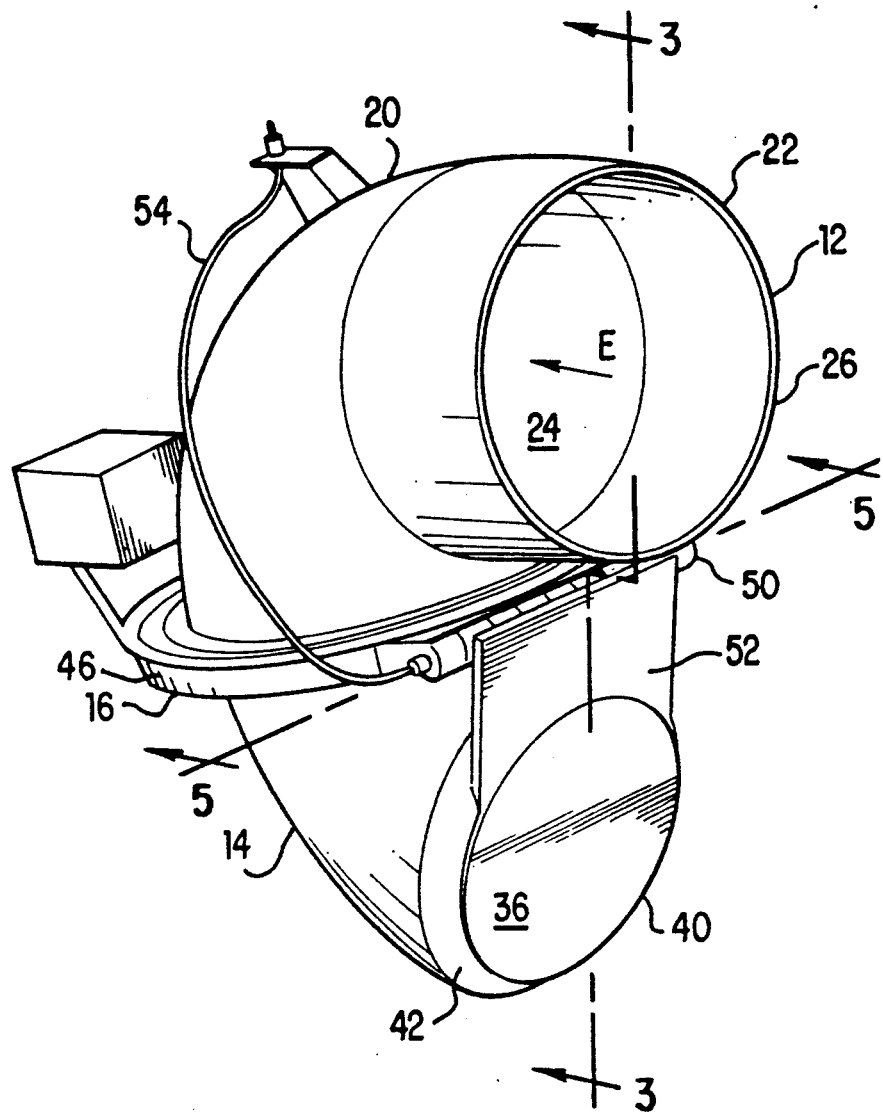
Figure 3:
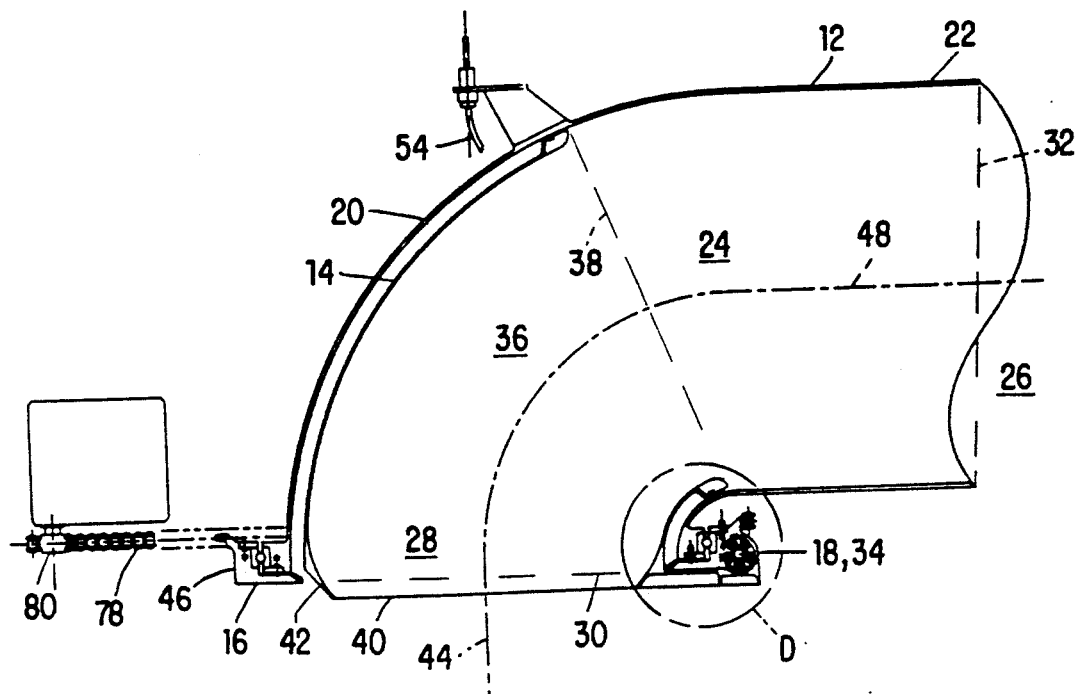
Figure 4:
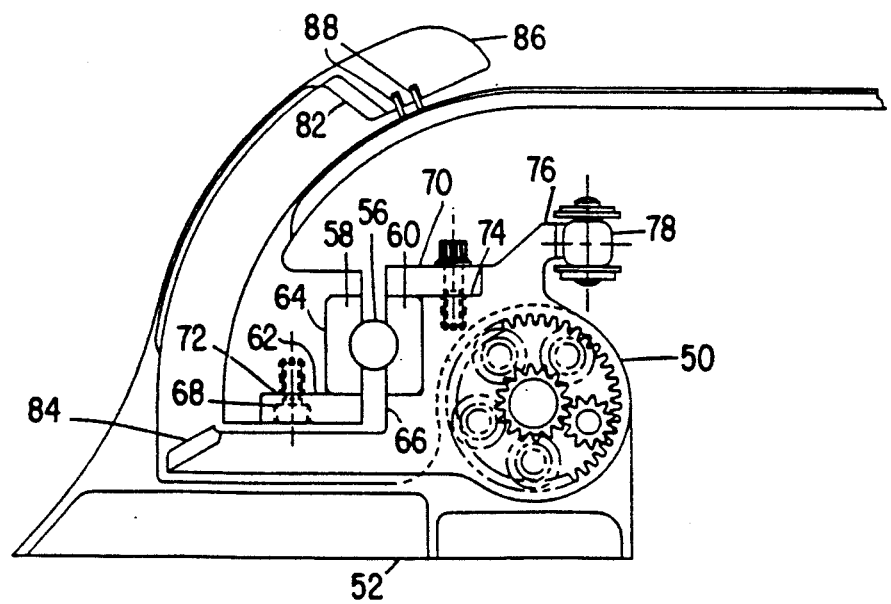
Figure 5:
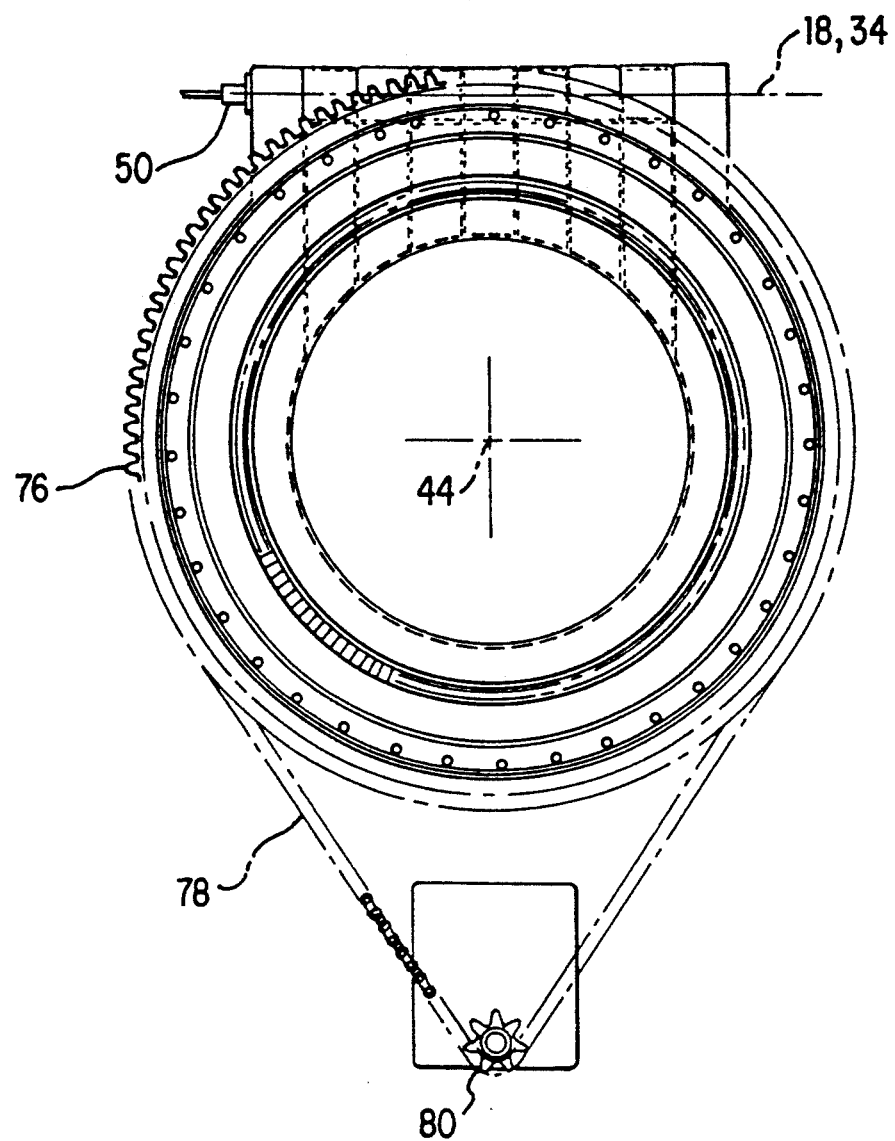
Figure 6:
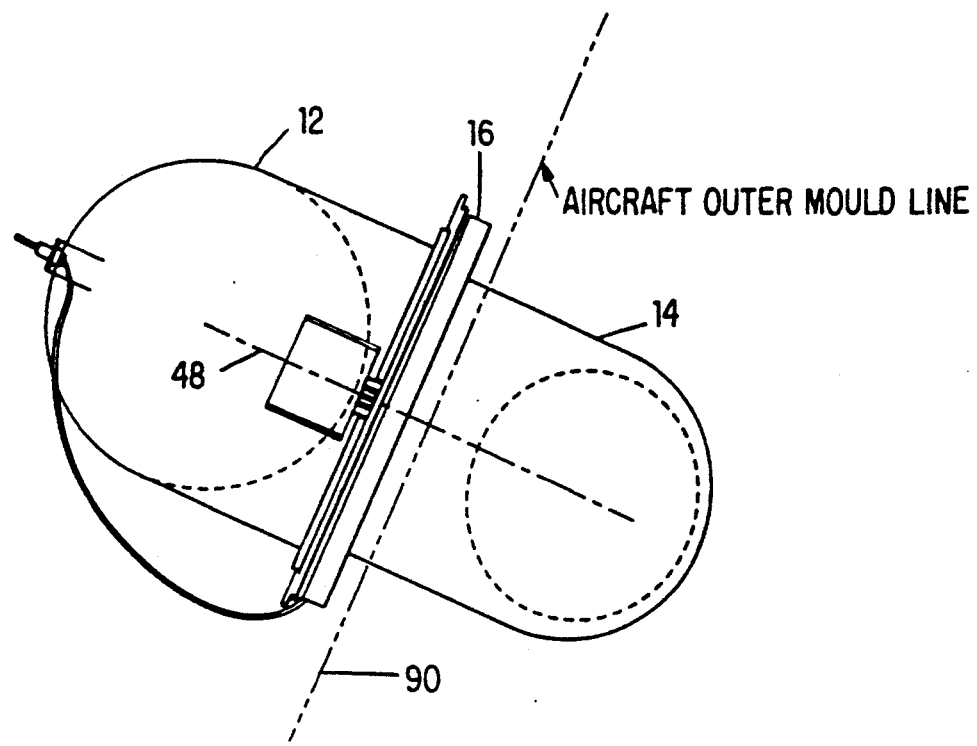
Figure 7:
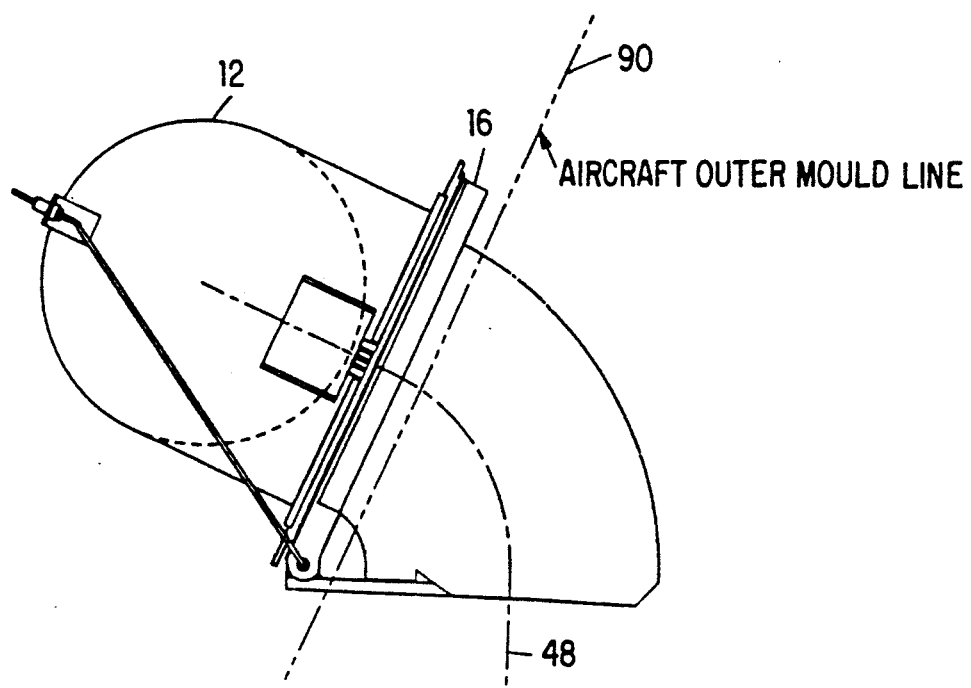
Figure 8:
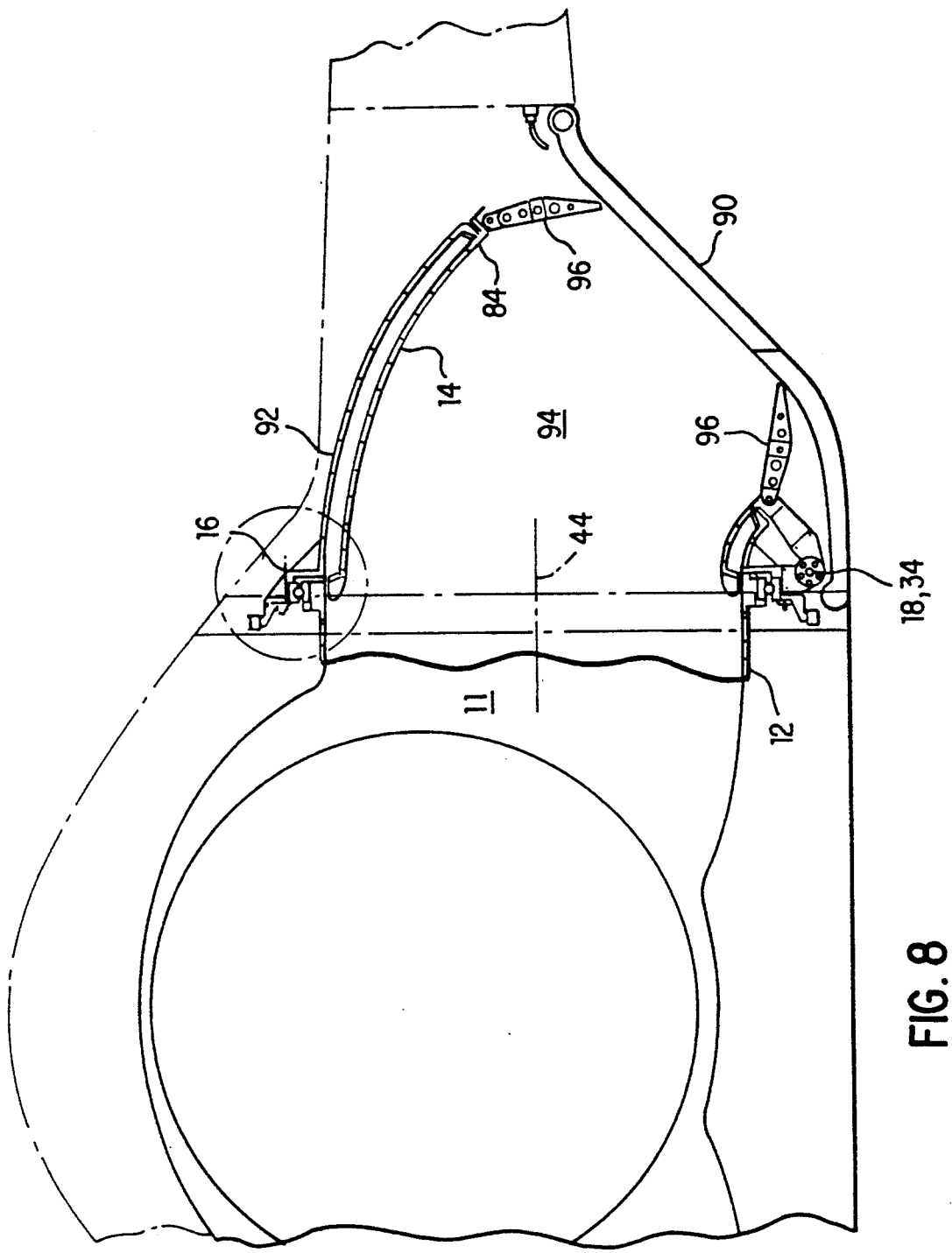

The invention will now be described in greater detail with reference, by way of example only, to the accompanying drawings, in which:

FIG. 1 shows a gas turbine engine incorporating vectorable nozzles of the present invention, FIG. 2 shows a nozzle employing the present invention in a first deployed configuration, FIG. 3 shows a sectional view, in the direction of arrows A—A, of the nozzle in a stowed configuration, FIG. 4 shows a detailed sectional view of region D in FIG. 3, FIG. 5 shows a sectional view, in the direction of arrows B—B, of the nozzle in the stowed configuration of FIG. 2, FIG. 6 shows a view in the direction of arrow C of the nozzle in the deployed configuration of FIG. 1, FIG. 7 shows a view in the direction of arrow C of the nozzle in a second deployed configuration, and FIG. 8 shows a sectional view similar to that shown in FIG. 3 but of a nozzle of the present invention in a second preferred embodiment.

Referring to FIG. 1, there is shown a gas turbine engine, for a VTOL aircraft, incorporating vectorable nozzles of the present invention. FIG. 1 shows the installation of only one such nozzle, the remainder having been omitted for clarity. The installation shown, however, is typical, and is applicable to all nozzles of the present invention Preferably, the engine is provided with a front and rear pair of laterally opposed side outlets 11, each for discharging diverted engine gases to a corresponding front and rear pair of vectorable nozzles 10. As shown, the front and rear nozzles receive engine gases diverted from the upstream and downstream ends of the engine respectively. In a preferred embodiment the front nozzles receive either fan or compressor discharge air, and the rear nozzles turbine exhaust gases.

Nozzle 10 comprises a cylindrical supply duct 12 and a toroidal nozzle segment 14 located at the downstream end of the duct. At its upstream end the duct cooperates with an engine outlet 11, and at its downstream end with the nozzle segment. The duct thereby provides a means for conveying engine gases to the nozzle segment in the direction of arrow E, whilst the nozzle segment provides an exhaust opening for the exiting gases.

As will be appreciated, duct 12 allows nozzle segment 14 to be installed in an airframe at a location remote from the engine.

Referring now to FIG. 3 duct 12 is bent at one end about an axis of revolution 18 to define a downstream toroidal portion 20 and a corresponding upstream cylindrical portion 22. Upstream and downstream portions 22 and 20 together define a constant area flow path 24 having an inlet 26 and an outlet 28. As shown, toroidal portion 20 forms a 90 degree bend in flow path 24 such that outlet flow plane 30 is disposed perpendicular to the inlet flow plane 32. Nozzle segment 14, which comprises a hollow segment of torus having an axis of revolution 34, defines a flow path 36 having an inlet 38, and an outlet 40. The flow path 36 further defines a convergent nozzle section 42 at the downstream end of the nozzle segment which is convergent in the flow direction. Preferably the toroidal nozzle segment 14 forms a bend in flow path 36 having an angle equal to or less than that of the corresponding toroidal duct portion 20.

As will be appreciated from the description hereinbelow, corresponding flow paths 24 and 36 cooperate to define a single continuous flow path between the gas turbine engine and the nozzle exit 40.

As shown in FIG. 1, duct 12 is static and is fixed in relation to the airframe, as such the duct provides a suitable structure from which to mount the nozzle segment.

Accordingly, a carrier ring 16 is provided for rotatably mounting the nozzle segment with respect to the duct. Carrier ring 16 is rotatably mounted to the downstream end of the duct about an axis 44, whilst the nozzle segment is rotatably mounted to the outer circumferential surface 46 of the carrier ring about its axis of revolution 34. As shown, axes 44 and 34 are offset perpendicularly with respect to one another. Axis 44 is coincident with flow centreline 48 at the duct outlet 28, whilst axis 34 is disposed parallel to a line tangential to the carrier ring. In the nozzle configuration shown in FIGS. 3 and 4, nozzle segment 14 and toroidal duct portion 20 are disposed concentrically about coincident axes 18 and 34. Preferably, the nozzle segment has an external cross-sectional diameter less than the internal diameter of the duct so as to be stowable therein.

Referring to FIG. 4, rotary actuator 50 is provided for rotatably mounting the nozzle segment with respect to the carrier ring. The rotary actuator 50 is of the type which comprises a plurality of epicyclic gears collectively arranged within a housing to convert a high speed low torque input drive into a low speed high torque output drive. Rotary actuator 50 is mounted tangentially to the outer circumferential surface 46 of the carrier ring, and as such is attached to a suitable reference member for effecting rotation of the nozzle segment about axis 34. The high torque output of actuator 50 is transmitted to the nozzle segment by means of a bracket member 52 which extends between the actuator and outlet 40 of the nozzle segment. The low torque input is transmitted to the actuator 50 by means of a flexible drive 54. As shown, flexible drive 54 has an input axis coincident with axis 44 at one end, and an output axis coincident with axis 34 at the other end.

A roller element bearing 56 is provided for rotatably mounting the carrier ring with respect to the duct. Inner race 58 of the bearing is mounted to the external surface of the duct, whilst outer race 60 is mounted to the inner surface of the carrier ring. As shown, an annular flange 62 is provided at the downstream end of the duct. Flange 62 includes a stepped outer circumferential surface 64 for receiving inner race 58 of the bearing. Likewise, the carrier ring is provided with a stepped inner circumferential surface 66 for receiving outer race 60. Inner and outer races 58 and 60 are fixedly secured to the duct and the carrier ring by means of retraining rings 68 and 70 respectively. Retaining ring 68 is secured to radial surface 72 of flange 62, and retraining ring 70 is secured to radial surface 74 of the carrier ring.

The carrier ring is provided with a toothed chain ring 76 which extends radially outwards from the upstream end of outer circumferential surface 46. Preferably chain ring 76 is formed integrally with the carrier ring. Chain ring 76 cooperates with a chain 78 which engages a drive sprocket 80 to define a chain drive therein. Collectively, chain ring 76, chain 78, and drive sprocket 80 define an actuator means for effecting rotation of the carrier ring about axis 44.

Nozzle 10 includes means for restricting the degree of rotation of the nozzle segment relative to the carrier ring. Preferably, the nozzle segment and the carrier ring are provided with corresponding conical abutment surfaces 82 and 84 respectively. Surfaces 82 and 84 are splined such that they interlock when the nozzle segment is fully deployed. Once engaged the splines provide a suitable means for transmitting torque from the chain drive mechanism to the nozzle segment. As shown in FIG. 3, surface 82, is disposed towards the upstream end of the nozzle segment, and extends generally radially from the external surface thereof towards the duct. Similarly, surface 84 is disposed about outlet 28 of the duct and extends generally radially across the gap defined between the duct and the nozzle segment.

In order to provide a streamlined transition between flow paths 24 and 36, the nozzle segment is further provided with an aerodynamically shaped upstream end face 86 at inlet 38.

Sealing rings 88 are provided to prevent leakage of the diverted engine gases before exiting the nozzle at outlet 40. The sealing rings 88 are seated in grooves machined in the external surface of the nozzle segment and are outwardly sprung so as to sealingly engage the duct internal surface. Preferably, the sealing rings are located at the upstream end of the nozzle segment.

The nozzle 10 operates as follows. Referring first to FIGS. 3 and 4, in which nozzle is shown in a stowed configuration. The nozzle segment is fully retracted into the toroidal portion of the duct. In this configuration the nozzle does not receive any flow from the engine.

Referring to FIG. 2, the nozzle segment has been rotatably positioned by energisation of rotary actuator 50, and is shown fully deployed for use. Further rotation of the nozzle segment about axis 34 is prevented by the abutment of surfaces 82 and 84.

Referring now to FIG. 6 which shows a typical airframe installation of nozzle 10, wherein line 90 depicts the outer skin of the aircraft. The nozzle 10 is shown in the deployed configuration of FIG. 2. In relation to the airframe the duct and carrier ring are located internally and the nozzle segment externally. In this configuration the diverted engine gases exit the nozzle in a rearwards direction and produce forward thrust on the airframe.

Referring now to FIG. 7 which shows the same installation as FIG. 6 but with the nozzle in a vertical thrust configuration. The nozzle segment is shown in the vertical position having been rotatably positioned about axis 44 by energisation of the chain drive mechanism. The engine gases now exit the nozzle in a downward direction and produce upward thrust on the airframe. Obviously, in this configuration the nozzle cannot be stowed without first returning to the configuration of FIG. 6.

It is to be understood of course, that when deployed, the thrust may be directed in any direction simply by rotating the nozzle segment about axis 44 to the required position.

Although this embodiment describes a nozzle segment that is telescopically stowable within a duct, it is to be appreciated that the nozzle could be equally stowable around the duct. Obviously, this would require the carrier ring to be mounted to a structure other than the duct, for example, the aircraft fuselage. Equally the degree of flow turning provided by nozzle segment 14 could be achieved with a plurality of concentric toroidal nozzle segments, each being telescopically stowable in relation to the other segments. This would provide for a tighter storage envelope when retracted.

Referring to FIG. 8, there is shown a nozzle of the present invention in a second preferred embodiment. With reference to the previously described embodiment, reference numerals given to components corresponding to those described in the previous embodiment are given like numbers.

In the embodiment shown there is provided an additional toroidal duct 92 which is fixed in relation to the carrier ring 16. Toroidal duct 92 forms an intermediate structural portion between carrier ring 16 at its upstream end, and splined abutment surface 84 at its downstream end, defining a constant area flow path 94 therebetween.

As shown, duct 92 is disposed concentrically with nozzle segment 14 about common toroidal axis 34. Nozzle segment 14 has an external cross sectional diameter less than the internal diameter of duct 92 so as to be stowable therein. In contrast to the previously described embodiment, the downstream end of supply duct 12 is cylindrical and as such is not capable of receiving nozzle segment 14.

In addition, FIG. 8 shows a nozzle of the present invention provided with known means for varying the exit area of the nozzle. In this embodiment convergent nozzle section 42 is defined by an annular array of flap elements 96, each of which are pivotally mounted to the downstream end of nozzle segment 14.

The nozzle of the second preferred embodiment operates in a manner identical to that of the first preferred embodiment as described previously. In the second embodiment, however, the nozzle segment may be retracted without first having to return to its initial deployed configuration.

We claim:

1. A vectorable nozzle for a gas turbine engine comprising:
    at least one toroidal nozzle segment movable between a stowed position and a deployed position;
    a supply duct interposed between the engine and the nozzle segment, the supply duct having a corresponding toroidal outlet portion adapted to telescopically receive the nozzle segment, the toroidal outlet portion defining a toroidal axis;
    a carrier ring mounting the nozzle segment relative to the duct, the nozzle segment being mounted for rotation relative to the carrier ring about a first nozzle axis for telescopic deployment, the first axis being coincident with the toroidal axis, the carrier ring being mounted for rotation relative to the supply duct about a second nozzle axis, the second nozzle axis being coincident with a flow centerline at an end of the duct;
    a first actuator means for rotating the nozzle segment about the first nozzle axis, and a second actuator means for rotating the carrier ring about the second nozzle axis.

2. The vectorable nozzle of claim 1, wherein the first actuator means comprises a rotary actuator fixed relative to the carrier ring and a flexible input drive device having an input axis coincident with the second nozzle axis, and an output axis coincident with the first nozzle axis.

3. The vectorable nozzle of claim 1 wherein the second actuator means comprises a chain drive.

4. The vectorable nozzle of claim 1, further comprising an interlocking nozzle segment and a corresponding carrier ring abutment surface.

5. The vectorable nozzle of claim 4, wherein the interlocking nozzle segment and the corresponding carrier ring abutment surface are splined.

6. The vectorable nozzle of claim 1 wherein the supply duct cooperates with an outlet of the gas turbine engine for conveying engine gases to the nozzle segment.

7. The vectorable nozzle of claim 6, wherein the supply duct cooperates with an outlet at an upstream end of the gas turbine engine and the engine gases comprise one of fan air and compressor discharge air.

8. The vectorable nozzle of claim 6, wherein the supply duct cooperates with an outlet at a downstream end of the gas turbine engine and the engine gases comprise turbine exhaust gases.

9. The vectorable nozzle of claim 1, further comprising varying means for varying a nozzle exit area, the varying means comprising an annular array of flap elements each pivotally mounted at a downstream end of the at least one toroidal nozzle segment.

10. The vectorable nozzle of claim 2, wherein the rotary actuator includes a plurality of epicyclic gears located within a housing.

11. The vectorable nozzle at claim 3, wherein the interlocking nozzle segment and the corresponding carrier ring abutment surface are tapered to form a rotationally conical abutment plane.

12. The vectorable nozzle of claim 5, wherein the interlocking nozzle segment and the corresponding carrier ring abutment surface are tapered to form a rotationally conical abutment plane.

13. A vectorable nozzle for a gas turbine engine comprising:
    at least one nozzle segment movable between a stowed position and a deployed position;
    a supply duct interposed between the engine and the nozzle segment;
    a carrier ring mounting the nozzle segment relative to the duct, the nozzle segment being mounted for rotation relative to the carrier ring about a first nozzle axis, the carrier ring comprising a toroidal duct portion having a toroidal axis coincident with the first axis, the toroidal duct portion extending from a downstream end of the carrier ring, the toroidal duct portion adapted to telescopically receive the nozzle segment, the carrier ring being mounted for rotation relative to the supply duct about a second nozzle axis, the second nozzle axis coincident with a flow centerline at an end of the duct;
    a first actuator means for rotating the nozzle segment about the first nozzle axis, and a second actuator means for rotating the carrier ring about the second nozzle axis; and
    restricting means for restricting a degree of rotation of the nozzle segment relative to the carrier ring, the nozzle segment including an abutment of a radially extending nozzle segment with a corresponding radially extending carrier ring surface, wherein the nozzle segment and corresponding carrier ring surface are splined.

* * * * *